(12) United States Patent
Smith et al.

(10) Patent No.: US 7,071,288 B2
(45) Date of Patent: Jul. 4, 2006

(54) TERPOLYMERS FROM LACTIDE

(75) Inventors: Dennis W. Smith, Seneca, SC (US); Nilmini Abayasinghe, Clemson, SC (US)

(73) Assignee: Clemson University, Clemson, SC (US)

( * ) Notice: Subject to any disclaimer, the term of this patent is extended or adjusted under 35 U.S.C. 154(b) by 30 days.

(21) Appl. No.: 10/819,900

(22) Filed: Apr. 7, 2004

(65) Prior Publication Data

US 2005/0004338 A1  Jan. 6, 2005

Related U.S. Application Data

(60) Provisional application No. 60/460,863, filed on Apr. 7, 2003.

(51) Int. Cl.
C08G 63/00 (2006.01)

(52) U.S. Cl. .................. 528/354; 528/355; 528/357; 528/358; 528/359; 528/363; 525/408; 525/411; 525/413; 525/415

(58) Field of Classification Search ............. 528/354, 528/359, 355, 357, 358; 525/408, 411, 413, 525/415

See application file for complete search history.

(56) References Cited

U.S. PATENT DOCUMENTS

| | | | |
|---|---|---|---|
| 5,633,342 A | 5/1997 | Verser et al. |
| 5,725,491 A | 3/1998 | Tipton et al. |
| 5,756,651 A | 5/1998 | Chen et al. |
| 5,908,918 A | 6/1999 | Chen et al. |
| 5,952,433 A | 9/1999 | Wang et al. |
| 6,093,792 A | 7/2000 | Gross et al. |
| 6,124,269 A | 9/2000 | Phan et al. |
| 6,172,128 B1 | 1/2001 | Lau et al. |
| 6,410,140 B1 | 6/2002 | Land et al. |
| 6,436,426 B1 | 8/2002 | Liao et al. |

OTHER PUBLICATIONS

Article—*A Novel Synthesis of Polyethers with Pendant Hydroxyl Groups by Polyaddition of Bis(oxetane)s with Bis(phenol)s*, Tadatomi Nishikubo, Atsushi Kameyama, Munehara Ito, Tomoe Nakajima, and Haruo Miyazaki, Journal of Polymer Science: Part A: Polymer Chemistry, vol. 37, 1999, pp. 2781-2790.

Article—*A Novel Synthesis of Reactive Polymers with Pendant Halomethyl Groups by the Polyaddition Reaction of Bis(epoxide)s with Bis(chloroacetocy)esters or Bis(bromoacetoxy)esters*, Tadatomi Nishikubo, Atsushi Kameyama, and Koji Ogawa, Journal of Polymer Science: Part A: Polymer Chemistry, vol. 35, 1997, pp. 3791-3799.

Article—*Synthesis and Characterization of [L]-Lactide—Ethylene Oxide Multiblock Copolymers*, Xianhai Chen, Stephen P. McCarthy, and Richard A. Gross, Macromolecules, vol. 30, 1997, pp. 4295-4301.

Article—*Synthesis and Properties of Fluorine-Containing Polyethers with Pendant Hydroxyl Groups by the Polyaddition of Bis(epoxide)s with Diols*, Yousuke Konno, Hiroto Kudo, Atsuchi Kameyama, and Tadatomi Nishikubo, Journal of Polymer Science: Part A: Polymer Chemistry, vol. 42, 2004, pp. 2543-2550.

Article—*Terpolymers from Lactide and Bisphenol A Derivatives: Introducing Renewable Resource Monomers into Commodity Thermoplastics*, Nilmini K. Abayasinghe and Dennis W. Smith, Jr., Macromolecules, vol. 36, 2003, pp. 9681-9683.

Article—*Novel Polyester Hydroxy Ether Terpolymers From Lactide And Bisphonel-A Derivatives*—Nilmini Abayasinghe and Dennis W. Smith, Jr., Polymer Preprints, vol. 43, 2002, pp. 615-616, no month available.

Presentation Agenda for 2002 Spring National ACS Meeting, Apr. 7-11, 2002, 2 pages.

PCT Search Report and Written Opinion for PCT US04/10719, Sep. 9, 2004.

*Primary Examiner*—P. Hampton Hightower
(74) *Attorney, Agent, or Firm*—Dority & Manning, P.A.

(57) ABSTRACT

The present invention is generally directed to a process for producing lactide-based polymers and the polymers produced by this process. The polymers of the present invention are terpolymers formed by the copolymerization of a lactide monomer, a linking monomer and an epoxy-terminated monomer. In one embodiment of the invention, the polymers may be formed from fluorine-containing monomers or aromatic ring-containing monomers. The disclosed materials may display improved hydrolytic and thermal characteristics as compared to previously known lactide-based materials. For example, the lactide based terpolymers may have a glass transition temperature over 60° C. For instance, lactide-based thermoplastic terpolymers of the present invention can have a glass transition temperatures of about 80° C. or higher. Lactide-based thermoset networks of the invention can have glass transition temperatures of up to about 200° C.

43 Claims, 8 Drawing Sheets

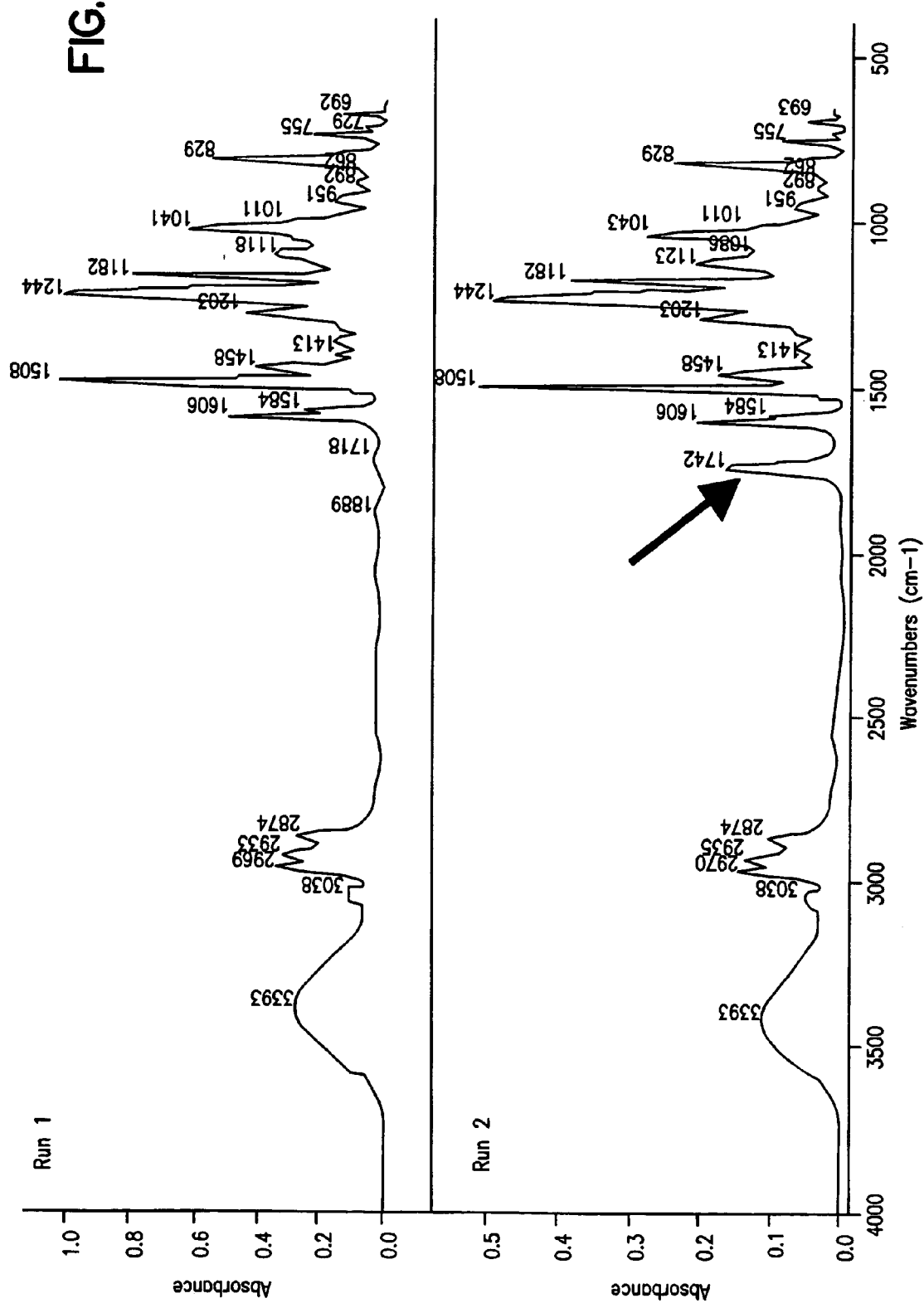

TERPOLYMERS FROM LACTIDE

CROSS REFERENCE TO RELATED APPLICATION

This application claims benefit to U.S. Provisional Application Ser. No. 60/460,863 filed Apr. 7, 2003.

BACKGROUND OF THE INVENTION

The production of polymers utilizing renewable resources has been a field of increasing interest for many years. One particular area of interest concerns the production of polymers, specifically polyesters, which may be formed from polymerization of lactic acid-based monomers. Specifically, ring-opening polymerization of lactide has shown promise in production of polymeric materials. Lactic acid-based materials are often of particular interest as the raw materials can be derived from renewable resources (e.g., corn, plant starches, and canes).

Various approaches have been attempted to obtain lactide-based polymeric materials having desired product characteristics. For example, copolymerization with other materials and preparation of substituted polylactides have been examined extensively. For instance, Chen, et al. ('Synthesis and Characterization of [L]-Lactide-Ethylene Oxide Multi-block Copolymers', *Macromolecules*, 1997, 30(15), 4295–4301) have examined direct copolymerization of lactide with oxirane using a wide range of tin and aluminum based organometallic catalysts.

The polymers obtained by such methods tend to have very limited applications, though some polylactide products based upon lactide alone are beginning to show possible association in some fiber and film technologies. Limitation to wider product applicability has been primarily due to the low glass transition temperatures of the polylactide products. In general, products obtained to date have a glass transition temperature ($T_g$) of about 60° C. or less.

Another problem encountered with lactic acid-based polymeric materials has been a lack of hydrolytic stability. For example, the hydrolytic stability of the polymers is often such that they degrade too quickly during use, rendering them unsuitable for many applications.

What is needed in the art are polymeric materials capable of displaying improved hydrolytic and thermal performance which may be produced from raw materials including those derived from renewable resources.

SUMMARY OF THE INVENTION

According to one embodiment of the present invention, a lactide-based terpolymer is disclosed formed by the ring-opening polymerization of a lactide monomer, an epoxy-terminated monomer having at least bi-functionality, and a linking monomer having at least bi-functionality. In particular, the linking monomer includes a first terminal functionality that can react with the lactide monomer upon ring opening of the lactide and also includes a second terminal functionality that can react with the epoxy-terminated monomer upon ring opening of a terminal epoxy group.

In one embodiment, the epoxy-terminated monomer and the linking monomer can be either bifunctional or tri-functional monomers, though higher order functionalities are also encompassed by the invention. For example, in one embodiment both the epoxy-terminated monomer and the linking monomer can be bi-functional, and the formed polymer can be a thermoplastic polymer.

Optionally one or both of the epoxy-terminated monomer and the linking monomer can be at least tri-functional, and the polymerization process can form a lactide-based polymeric thermoset network.

In one embodiment, the epoxy-terminated monomer and the linking monomer can be designed so as to include particular moieties that can provide specific characteristics to the product polymers. For example, in certain embodiments, the linking monomer can include one or more aromatic groups or can include fluorine-containing moieties. In one embodiment, the linking monomer can be a phenolic derivative such as bisphenol-A. In one particular embodiment, the linking monomer can be 4,4'-hexafluoroisopropylidenediphenol. In another embodiment, the linking compound can be a tri- or higher-functional compound such as 1,1,1-tris(hydroxyphenyl)ethane. Other possible linking monomers can include amino compounds such as, for example, bis-amines or anilines.

Similarly, in certain embodiments, the epoxy-terminated monomer can include one or more aromatic groups. For instance, the epoxy-terminated monomer can be a bisphenol-A derivative. In one embodiment, the epoxy-terminated monomer can be a glycidyl ether. For example, the epoxy-terminated monomer can be diglycidyl ether of bisphenol-A.

Both thermoplastic and thermoset lactide-based terpolymers of the present invention can have glass transition temperatures higher than those of comparable previously known lactide-based polymers. For example, thermoplastic lactide-based terpolymers of the present invention can have a glass transition temperature of greater than about 60° C. In one embodiment, the disclosed lactide-based thermoplastic terpolymers can have glass transition temperatures greater than about 70° C., for example between about 75° C. and about 95° C. Thermoset lactide-based terpolymers of the present invention can, in one embodiment, have glass transition temperatures of greater than about 100° C. In one particular embodiment, thermoset lactide-based terpolymers of the invention can have glass transition temperatures of between about 190° C. and about 210° C.

The polymeric products of the invention can, in certain embodiments have a polydispersity of between about 1.5 and about 3.5.

In one embodiment of the present invention, the disclosed polymers can be utilized to form polymeric films, coatings or fibers. Polymeric materials of the present invention can be formed according to any suitable formation process, including, for example, solution casting methods for forming polymeric films as are generally known in the art. The disclosed polymers can form materials of a wide variety of sizes and thickness. For example, polymeric films of the invention can, in one embodiment, be formed having a thickness between about 2 μm and about 200 μm. Polymeric coatings of the disclosed materials can be formed having a thickness of about 200 μm or even greater, in some embodiments. For example, coatings of about 1 mm in thickness can be formed of the disclosed materials. Similarly, polymeric fibers can be formed of the disclosed materials and can be formed with a wide variety of diameters, in one embodiment greater than about 100 μm. In another embodiment, polymeric fibers and monofilaments of the present invention can have a diameter of between about 50 μm and about 1 cm.

In one embodiment, the disclosed polymers can be formed according to a process wherein a lactide monomer, an epoxy-terminated monomer having at least bi-functionality, and a linking monomer having at least bi-functionality can be combined with a suitable solvent. A catalyst can then be added to the solution to initiate the polymerization of the lactide-based terpolymers of the invention.

The lactide monomer, the epoxy-terminated monomer, and the linking monomer can, in one embodiment, be provided in a 1:1:1 molar ratio, though this is not a requirement of the invention.

In some embodiments, the polymerization process can also include heating the solution to a temperature of between about 100° C. and about 200° C.

According to various embodiments of the invention, exemplary catalysts suitable for the disclosed process can include phosphonium-based catalysts, quaternary ammonium salt catalysts, or crown ether complexes. For example, according to one particular embodiment, the catalyst can be selected from the group consisting of ethyltriphenylphosphonium acid acetate (ETPPAAc), ethyltriphenlphosphonium iodide (ETTPPI), benzyltriphenylphosphonium chloride (BzTPPCl), 18-Crown-6 (18C6), tetrabutylammonium chloride (TBAC), tetrabutylammonium bromide (TBAB), potassium chloride (KCl), potassium bromide (KBr), and mixtures thereof with or without heterogenous supports such as alumina, $MgCl_2$, carbon, zeolites, silica, or clay. The disclosed catalysts can, in one embodiment, also be utilized to form a copolymer of the epoxy-terminated monomer and the linking monomer, without the addition of the lactide monomer.

In general, the solvent can be one that has a boiling point less than about 200° C. at atmospheric pressure. For example, the solvent can be anhydrous toluene, 2-methoxyethyl ether, 1-phenoxy-2-propanol, or N,N'-dimethylacetamide. In one particular embodiment, the solvent can be an ecologically compatible or 'green' solvent such as, for example, ethyl lactate.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying figures, in which:

FIGS. 6A and 6B illustrates FTIR spectra of exemplary polymeric networks of the present invention;

DETAILED DESCRIPTION OF THE INVENTION

Figure 1:
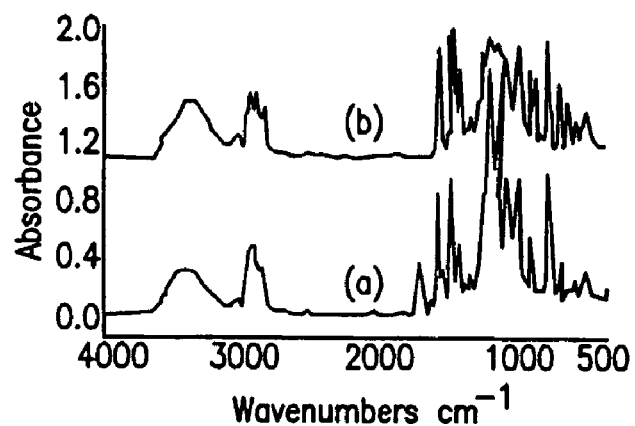
FIG. 1 illustrates FTIR spectra for exemplary polymer films of the present invention.

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used with another embodiment to yield a still further embodiment. Thus, it is intended that the present invention cover such modifications and variations as come within the scope of the appended claims and their equivalents.

In general, the present invention is directed to novel polymeric materials and processes for producing the disclosed materials. In one embodiment, the polymeric materials of the present invention are polymeric materials that can exhibit good thermal and hydrolytic characteristics and can, in one embodiment, include monomers derived from renewable resources. Production and use of the disclosed materials can reduce problems associated with previously known petroleum-based plastics, including environmental problems faced while obtaining the raw petroleum materials and during production of the materials, as well as problems associated with the eventual disposal of the petroleum-based materials.

The disclosed novel materials can exhibit improved product characteristics as compared to previously known lactic acid-based polymers. In particular, the disclosed materials can exhibit improved physical characteristics including, for example, glass transition temperatures and hydrolytic characteristics so as to be suitable for use in a wide variety of commercial applications. For example, the polymers of the present invention may be utilized in the formation of packaging materials, fibers, and coatings.

In general, the process of the present invention includes a ring-opening polymerization reaction of lactide with an epoxy monomer having at least bi-functionality and a linking monomer having at least bi-functionality to produce a novel terpolymer. In certain embodiments, the thermal and hydrolytic characteristics of the terpolymers may be further improved by copolymerization of the lactide with fluorine-containing and/or aromatic monomers. Through the processes of the present invention, lactide-based thermoplastic terpolymers can be produced with glass transition temperatures greater than about 60° C. and lactide-based thermoset networks can be produced having glass transition temperatures of up to about 200° C., or even greater, in some embodiments.

Lactic acid occurs in nature via fermentation of carbohydrates such as glucose, sucrose, and lactose. Lactic acid is produced commercially by fermentation of whey, cornstarch, potatoes, molasses, and the like. The lactide monomer is formed by the depolymerization of the lactic acid oligomer. In the past, production of lactide was a slow, expensive process, but recent advances in the art have enabled the production of high purity lactide at reasonable costs. The chiral carbon atom in the lactic acid structure results in the three stereoisomers of lactide, shown below:

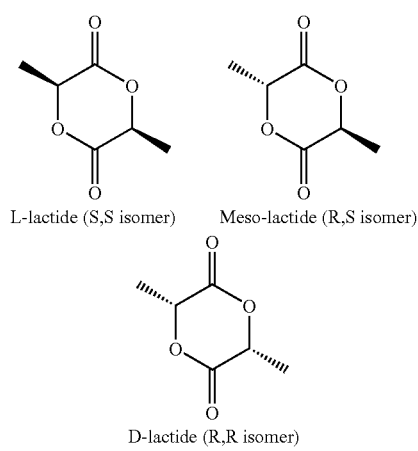

L-lactide (S,S isomer)    Meso-lactide (R,S isomer)

D-lactide (R,R isomer)

According to the processes of the present invention, either racemic mixtures or pure enantiomers of lactide may be utilized. In general, a racemate of L- and D-lactide may be preferred due to economic realities, though this is not a requirement of the invention.

In general, the polymerization process of the present invention includes the ring-opening polymerization of a lactide monomer with an epoxy-terminated monomer having at least bi-functionality and a linking monomer having at least bi-functionality to produce novel terpolymers. In general, the reaction process may be illustrated as follows:

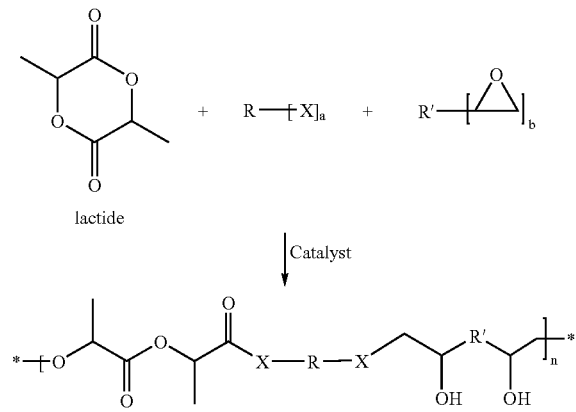

wherein:

X is selected from the group consisting of reactive functional groups including hydroxyl groups and esters thereof, carboxylic acid groups, thiocarboxylic acid groups, thiocarboxylic and carboxylic esters, lower alkyl esters of from one to about 12 carbon atoms, such as methyl and ethyl esters, acyl halides such as chlorides, isocyanates, acyl azides, acetyl groups, trihaloacetyl groups, primary or secondary amines, sulfide groups, sulfonic acid groups, sulfonamide groups, ketones, aldehydes, primary or secondary amides, nitro groups, cyano groups, anhydrides, imides, cyanate groups, vinyl, allyl, acetylene groups; silicon-containing substituents such as alkyl silanes, siloxanes, chlorosilanes, phosphorus-containing groups such as phosphines, phosphate, phosphonate and groups convertible into reactive functional groups including esters: trihalomethyl groups; alkoxy groups; and the like.

In one embodiment, X is selected from hydroxyl groups and esters thereof, carboxylic or thiocarboxylic acid ester groups, carboxylic acid groups, acyl chlorides, isocyanates, acetylenic groups, alkoxy groups, and primary or secondary amines.

In another embodiment, X is selected from hydroxyl and esters thereof, carboxylic acid ester groups, carboxylic acid groups, acyl chlorides, isocyanates, acetylenic groups, and primary or secondary amines.

$a \geq 2$;

$b \geq 2$ (Obviously, when a and/or b are greater than 2, the corresponding multi-functional terpolymer will be formed, as is generally known in the art);

R is any molecular structure, either straight-chain, aromatic or a single heteroatom, which can link two or more X groups; and R' is any molecular structure, either straight-chain, aromatic, or a single heteroatom, which can link two or more epoxy groups. In one embodiment, R' can include an ether.

According to alternative embodiments of the present invention, polymeric materials can be formed according to the present invention including combinations of both bi-functional and higher-functional materials. That is, polymeric materials encompassed by the present invention include those formed including a combination of bifunctional epoxy monomers with higher-functional epoxy monomers as well as those including a combination of bifunctional linking monomers with higher-functional linking monomers.

The characteristics of the products formed according to the presently disclosed processes may be particularly designed or otherwise enhanced through specific selection of the monomers to be polymerized. For example, in one embodiment, specific functional moieties may be included on the monomers that can provide desired characteristics to the formed polymeric materials. For instance, as is generally known in the art, the surface energy of a polymer is related to the functional groups that gather at its surface. In addition, fluorinated groups are known to produce polymers with low surface energy. As such, in one embodiment of the present invention, the hydrophilic stability of the polymeric product may be improved by utilizing monomers that include fluorine-containing moieties. Similarly, other functional groups, such as aromatic moieties, may be introduced to the monomers to enhance physical characteristics of the polymeric products.

In one embodiment, the linking monomer can be a derivative of bisphenol-A, though higher order phenolic compounds are also encompassed by the present invention. For example, in one embodiment, the linking monomer can be 1,1,1-tris(hydroxyphenyl)ethane (THPE), which has a configuration of:

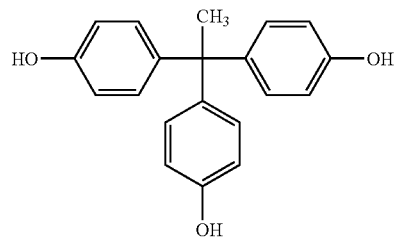

Other possible R groups on the linking compound can include those comprising one or more aromatic groups either with or without phenolic hydoxyl groups such as, for example:

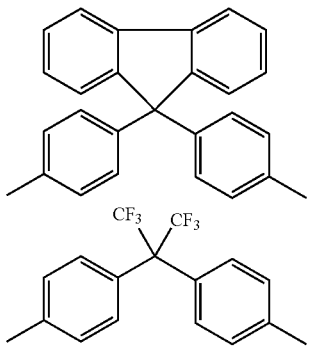

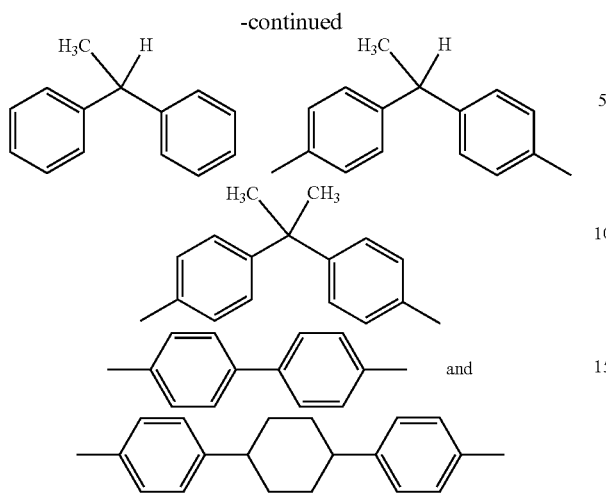

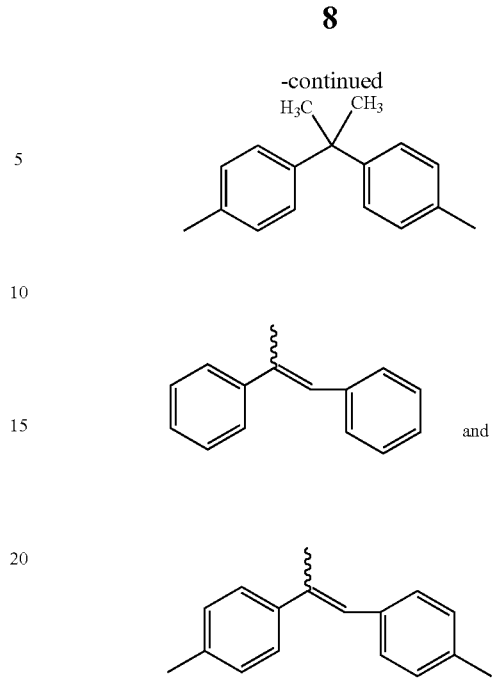

Similar to the linking monomer, the epoxy-terminated monomer can also be a phenolic compound such as a derivative of bisphenol-A.

In one embodiment, the epoxy-terminated monomer can be a glycidyl ether. For example, the epoxy-terminated monomer can be a di- or triglycidyl ether with or without aromatic groups included in the monomer.

Optionally, the epoxy-terminated monomer can include one or more aromatic groups either with or without ether linkages to the terminal epoxy groups. For example, a non-limiting list of possible R' groups can include:

In one embodiment of the present invention, both the linking monomer and the epoxy-terminated monomer can be derivatives of bisphenol-A, which can, upon polymerization with lactide, form novel lactide-based polyester hydroxy-ether terpolymers.

In one particular embodiment of the present invention, both fluorocarbon and aromatic moieties may be introduced to the polymer to produce polyesters with enhanced hydrolytic and thermal characteristics. For example, in one particular embodiment of the present invention, lactide may be polymerized with 4,4'-hexafluoroisopropylidenediphenol (6F-Bis-A) and diglycidyl ether of bisphenol-A (DGEBA) to produce novel terpolymer polyester hydroxy-ethers according to the following reaction:

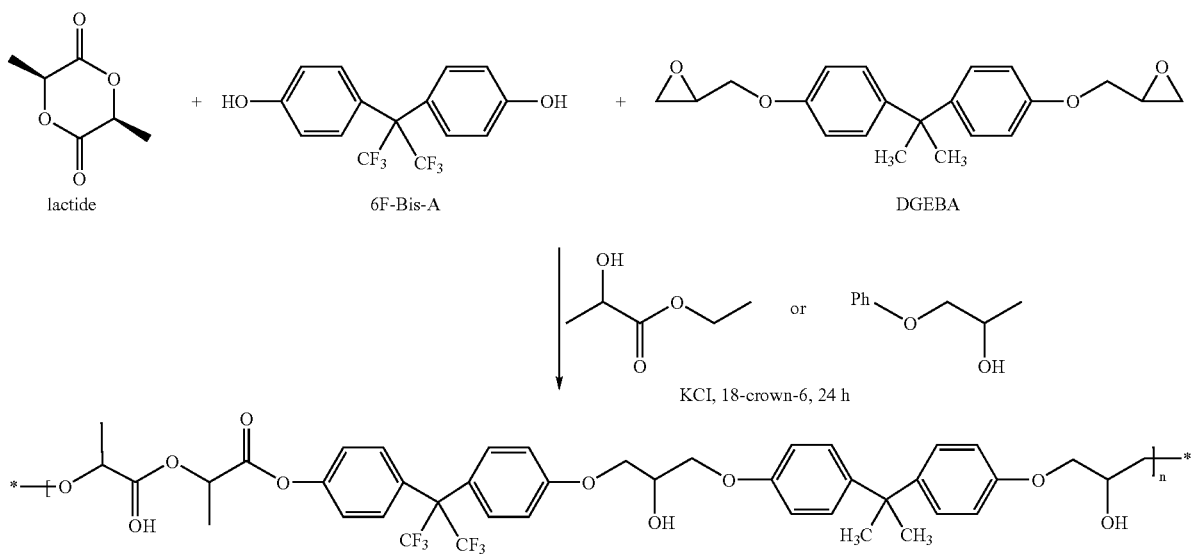

According to the formation processes of the present invention, monomers may be combined in the desired proportions in a suitable solvent. Experimental work has suggested that in one embodiment, one lactide can be opened for each of the other two monomers. As such, in one embodiment, the three monomers can be provided in a 1:1:1 molar ratio. Other ratios of monomers may be utilized in other embodiments, however, and a 1:1:1 molar ratio is not a requirement of the present invention. For instance, in certain embodiments, the molecular weight of the product polymer can vary depending upon molar ratios of the reactants. As such, in some embodiments of the present invention the molar ratios of the reactants can be varied in order to form product polymers within a defined molecular weight range. For example, in other embodiments, any one of the reactants can be provided at greater than or less than a 1:1 ratio with either of the other reactants.

In general, in order to form the disclosed polymeric materials, a solution of the reactants may be prepared with an organic solvent that has a suitably high boiling point so as to not boil at the reaction temperature. For example, a non-limiting list of possible solvents may include anhydrous toluene, 2-methoxyethyl ether (available as Diglyme, available from Aldrich Chemical), 1-phenoxy-2-propanol (available as Dowanol™ from Aldrich Chemical), and DMAc (N,N'-dimethylacetamide). For example, in one embodiment, the solvent can be an ecologically friendly or "green" solvent. In one particular embodiment, ethyl lactate, a solvent that can be derived from cornstarch, can be used in the process.

Optionally, the solution may be stirred and heated prior to addition of the catalyst. For example, the solution may be heated to a temperature of between about 100° C. and about 200° C. In one particular embodiment, the solution may be heated to a temperature of about 110° C.

Many different catalysts may be utilized in the process of the present invention. In the past, lactide polymers including polylactides and lactide copolymers were often polymerized in the presence of stannous or aluminum catalysts. In the present invention, however, it has been discovered that lactide terpolymers may be produced utilizing catalysts previously utilized for copolymerization of esters and epoxides in the production of polyesters. For instance, a variety of phosphonium-based catalysts may be utilized in the present process. Typically, phosphonium catalysts show excellent reactivity in epoxy systems and can be used at low temperatures.

In general, any catalyst which may display high catalytic activity in the reaction of active esters with epoxides may be used in the invention. For instance, catalysts suitable for the processes of the present invention include a variety of quaternary ammonium salts and crown ether complexes. Other suitable catalysts can include, but are not limited to, ethyltriphenylphosphonium acid acetate (ETPPAAc), ethyltripheniphosphonium iodide (ETTPPI), benzyltriphenylphosphonium chloride (BzTPPCl), 18-Crown-6 (18C6), tetrabutylammonium chloride (TBAC), tetrabutylammonium bromide (TBAB), potassium chloride (KCl), potassium bromide (KBr), and mixtures thereof.

In another embodiment of the invention, it has been found that the disclosed catalysts may be used to polymerize phenolic or amine terminated monomers with epoxy-terminated glycidyl ethers, without the addition of the lactide monomer. According to this embodiment, polyethers containing pendant hydroxyl groups can be obtained via a novel polymerization process. Specifically, it has been discovered that these copolymers can be formed utilizing catalysts not previously utilized for this particular polymerization process. Thus, the formation of these polymeric materials can be carried out utilizing catalysts that may be less expensive or more readily available than catalysts used in formation processes for these materials known in the past.

In general, the catalyzed reaction of this particular embodiment of the present invention can be illustrated as follows:

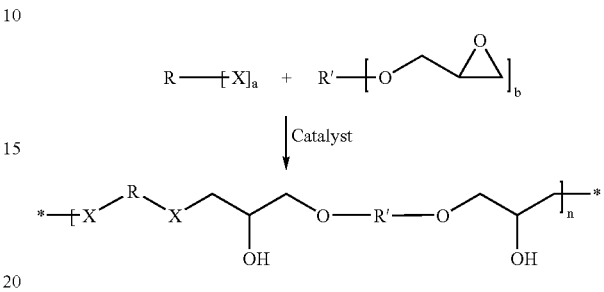

wherein: X is —NH$_2$ or —C$_6$H$_4$OH a≧2;

b≧2 (Obviously, when a and/or b are greater than 2, the corresponding multi-functional terpolymer will be formed, as is generally known in the art);

R is any molecular structure, either straight-chain, aromatic or a single heteroatom, which can link two or more phenolic or amine groups;

R' is any molecular structure, either straight-chain, aromatic, or a single heteroatom, which can link two or more glycidyl ether groups; and the catalyst is one or more of: quaternary ammonium salts, crown ether complexes, ethyltriphenylphosphonium acid acetate (ETPPAAc), ethyltriphenlphosphonium iodide (ETTPPI), benzyltriphenylphosphonium chloride (BzTPPCl), tetrabutylammonium chloride (TBAC), tetrabutylammonium bromide (TBAB), potassium chloride (KCl), potassium bromide (KBr). In one particular embodiment, the catalyst can include 18-Crown-6 (18C6).

Generally, following addition of the catalyst, polymerization of the reactants (either with or without the lactide component) can automatically proceed over a period of time. For example, in one embodiment, a solution including the reactants and the catalyst can be stirred for a period of about 24 hours to achieve polymerization. The amount of time necessary for completion of the polymerization process can vary widely, however. For example, the time required for polymerization following addition of the catalyst to the solution can be anywhere from substantially instantaneous to a period of several days.

Depending upon the specific reactants, catalysts, and solvents used in the process, product terpolymers displaying certain desired physical characteristics may be obtained. For example, through variation of the molar ratio of reactants, terpolymers with varying molecular weights may be obtained, as discussed above. Additionally, molecular weight of the product polymer can be controlled through variation of the catalyst and/or solvent used in the process. The polydispersity of the product polymers ($M_w/M_n$) can be similarly controlled through variation of solvent and/or catalyst, as is generally known in the art. For example, in various embodiments of the invention, the polydispersity of the polymeric products of the present invention can be between about 1.5 and about 3.5.

In one embodiment, the lactide terpolymers of the present invention may be prepared having a number average molecular weight ($M_n$) between about 3500 and about 50000, though in other embodiments, even higher or lower molecular weight polymers may be obtained. For instance, in one embodiment thermoplastic polymeric products of the present invention can be formed having number average molecular weights greater than about 50000. Thermoset networks of unlimited molecular weight can be prepared utilizing known tri- or higher-functional monomers.

According to the present invention, novel lactide-based terpolymers may be prepared having higher glass transition temperatures than other lactide-based polymers previously known. For example, thermoplastic polyesters of the present invention may have a glass transition temperature between about 58° C. and about 80° C., or, in certain embodiments, even higher, while thermoset networks of the disclosed terpolymers can display $T_g$ of up to or even greater than about 200° C.

Following the initial polymerization process, the polymeric product material may be purified according to any suitable process. For example, in one embodiment, the polymeric product material may be precipitated into n-hexane and dried to a solid. Any other suitable purification process as is generally known in the art may alternatively be utilized, however.

The lactide-based polymeric product material produced according to the processes of the present invention may be utilized to form polymeric products such as polymeric films, fibers, or coatings according to processes generally known in the art. For example, in one embodiment, the lactide-based polymeric material may be solution cast from a solvent to form a polymeric film. If desired, the polymer-containing solution can be cast at very high solids content. For example, solutions of polymeric products may be cast wherein the polymers can be present in solution at amounts of up to about 70% by weight of the solution. In such an embodiment, relatively thick films and coatings may be prepared from the polymeric solutions. In some embodiments, polymeric films having a thickness of about 2 µm may be prepared from the disclosed polymeric materials. For example, polymeric films of the invention can, in one embodiment, be formed having a thickness between about 2 µm and about 200 µm. In one embodiment, even thicker coatings may be prepared. Thick coatings can be formed, for example, as surface coatings in painting or similar coverage applications. For example, in one embodiment, coatings of the disclosed lactide-based polymers can be formed having a thickness of up to or even greater than about 1 mm. The films and coatings of the present invention can generally be utilized in any application in which previously known epoxy resins have been found useful. For example, in one embodiment, the materials can be utilized as barrier coatings, such as moisture barrier coatings on beverage or other liquid containers.

In one embodiment, the disclosed materials can be formed into fibers, for example textile or monofilament fibers. For example, the lactide-based polymeric materials can be melt spun or solution spun to form polymeric fibers. In general, fibers having a diameter of between 2 µm and about 200 µm can be formed of the disclosed materials. In another embodiment, polymeric fibers or monofilaments of the present invention can have a diameter of between about 50 µm and about 1 mm. In one embodiment, large polymeric monofilaments can be formed having a diameter of about 1 cm. Fibers and monofilaments of the disclosed invention can be utilized in a variety of textile application, such as, for instance, the formation of woven or nonwoven materials. In one embodiment, the disclosed fibers and materials formed therefrom can be used in biological applications, in particular in those embodiments where in the polymeric materials are biocompatible and optionally biodegradable. For example, the disclosed fibers can be utilized as sutures in biomedical applications.

Reference now will be made to various embodiments of the invention, one or more examples of which are set forth below. Each example is provided by way of explanation of the invention, not as a limitation of the invention.

EXAMPLE 1

Polymer Preparation

To a 150 mL three-necked round bottom flask fitted with Friedrich's condenser septum and overhead stirrer was added various ratios of DGEBA, 6F-Bis-A, and lactide with 50 wt % solvent. The temperature was increased to 110° C. with stirring and 5 mol % of catalyst was added. In those examples wherein two catalysts were added, 5 mol % of each catalyst was added. The reaction was stirred for 24 After 24 hours, the contents were diluted with tetrahydrofuran (THF) to 20 wt % polymer and precipitated into n-hexane with vigorous stirring. The polymer material was dried in a vacuum oven at 60° C. Films of the polymers were solution cast from the THF solution.

Catalysts were selected from ethyltriphenylphosphonium acid acetate (ETPPAAc), ethyltriphenylphosphonium iodide (ETTPPI), benzyltriphenylphosphonium chloride (BzTPPCl), 18-Crown-6 (18C6), tetrabutylammonium chloride (TBAC), tetrabutylammonium bromide (TBAB), potassium chloride (KCl), potassium bromide (KBr), and mixtures thereof.

Solvents were selected from anhydrous toluene, 2-methoxyethyl ether (available as Diglyme, available from Aldrich Chemical), 1-phenoxy-2-propanol (available as Dowanol™ from Aldrich Chemical), and DMAc.

Polymers 1–8, listed in Table 1, below, were prepared from 1:1:1 mole ratio of reactants using a variety of catalysts and solvents, as shown below in the table.

TABLE 1

| Polymer No. | Solvent | Catalyst | $M_n$ (GPC v. PS) | $M_w/M_n^a$ |
|---|---|---|---|---|
| 1 | toluene | BzTPPCl | 10200 | 1.8 |
| 2 | toluene | 18-C-6/KCl | 10400 | 2.0 |
| 3 | toluene | ETPPAAc | 3800 | 1.8 |
| 4 | toluene | TBAC | 13800 | 2.3 |
| 5 | toluene | TBAB | 13300 | 1.9 |
| 6 | DowanolTM | TBAC | 8700 | 1.7 |
| 7 | DowanolTM | 18C6/KBr | 6075 | 1.7 |
| 8 | DowanolTM | 18C6/KCl | 46000 | 2.3 |

Polymers 9–23, listed in Table 2, below, were prepared from a variety of monomer feed ratios as well as different catalysts and various solvents, as described in the table.

TABLE 2

| Polymer No. | Lactide/ DGEBA/ 6F-Bis-A Mol ratio | Catalyst | Solvent | Mn (GPC v. PS) | Mw/Mn |
|---|---|---|---|---|---|
| 9 | 2/1/0 | ETPPAAc | DMAc | 8000 | 1.03 |
| 10 | 1/0/0 | ETPPAAc | DMAc | 3800 | 1.6 |

TABLE 2-continued

| Polymer No. | Lactide/ DGEBA/ 6F-Bis-A Mol ratio | Catalyst | Solvent | Mn (GPC v. PS) | Mw/Mn |
|---|---|---|---|---|---|
| 11 | 2/1/0 | ETPPI | DMAc | 3300 | 1.2 |
| 12 | 1/0/0 | ETPPI | DMAc | 5100 | 4.5 |
| 13 | 1/1/0 | BzTPPCl | DMAc | 4300 | 1.5 |
| 14 | 0/1/0 | BzTPPCl | DMAc | gel | — |
| 15 | 2/1/0 | BzTPPCl | DMAc | 3400 | 1.6 |
| 16 | 1/2/2 | TBAC | DMAc | 6900 | 1.7 |
| 17 | 2/1/1 | TBAC | Diglyme | 7600 | 2.1 |
| 18 | 2/1/1 | TBAB | Diglyme | 6600 | 1.7 |
| 19 | 2/1/1 | 18C6/KCl | Dowanol™ | 11100 | 1.5 |
| 20 | 1/2/2 | 18C6/KCl | Dowanol™ | 22000 | 1.6 |
| 21 | 1/0/1 | 18C6/KCl | Dowanol™ | No polym. | — |
| 22 | 0/1/1 | 18C6/KCl | Dowanol™ | 21000 | 1.7 |
| 23 | 1/1/1 | 18C6/KCl | Neat | 13700 | 3.5 |

The structures of the polymers obtained were determined by IR, $^1$H and $^{13}$C NMR spectroscopy. The $^1$H NMR and the $^{13}$C NMR spectrums were recorded on a Bruker AC 300 MHz NMR Spectrometer. Chloroform-d was used as the solvent. Infrared (IR) analyses were performed on films using a Nicolet Magna spectometer 550. Differential Scanning calorimetry (DSC) and Thermal Gravimetric Analysis (TGA) data were obtained on a Mettler-Toledo DSC820 system. Thermal responses were measured with samples in a nitrogen atmosphere at 10° C./min. Gel Permeation Chromatography (GPC) data were obtained at ambient temperature on a Waters 2690 Alliance system equipped with 2410 refractive index and 996 photodiode array detectors.

A solution cast film from THF solvent was prepared from polymer number 8 with the following FTIR: (cm$^{-1}$) 928, 951, 967, 1042, 1132, 1173, 1206, 1250, 1297, 1502, 1586, 1600, 1744, 2875, 2930, 2963, 3425. $^1$H$^{NMR}$ (300 MHz, CDCl$_3$) δ: 1.3 (2H, m, CH$_2$), 1.53 (3H, d, CH$_3$), 1.61 (3H, d, CH$_3$), 2.92 (1H, s), 3.0 (H, s) 3.7 (H, m), 3.9 (2H, m), 5.1 (H, m, α-H lactide), 5.5 (H, m, α-H lactide), 6.81 (4H, d, DGEBA aromatic), 6.88 (4H, d, 6F-bis-A aromatic), 7.1 (4H, d, DGEBA aromatic), 7.28 (4H, d, 6F-bis-A aromatic). $^{13}$C NMR δ: 16.6, 21, 30.9, 42, 68.7, 69.0, 113.9, 126.0, 127.7, 131.6, 143.5, 156.2, 158.6, 176.0.

A solution cast film from THF solvent was prepared from a polymer similar to number 8, but with the solvent being ethyl lactate rather than Dowanol™ with the following FTIR: (cm$^{-1}$) 928, 951, 967, 1042, 1132, 1173, 1206, 1250, 1297, 1502, 1586, 1600, 1744, 2875, 2930, 2963, 3425. $^1$H NMR (500 MHz, CDCl$_3$) δ: 1.39–1.8 (15H, m, CH$_3$), 2.8 (1.7H, m, OH), 4.1–4.4 (9.5H, m), 5.16 (1.5H, m, a-H LA), 5.53 (1H, m, α-H LA), 6.72–7.0 (8.1 H, m, aromatic), 7.0–7.4 (8.1H, m, aromatic). $^{13}$C NMR (125 MHz, CDCl$_3$) δ: 16.6, 21.0, 30.9, 42.0, 68.7, 69.0, 113.9, 126.0, 127.7, 131.6, 143.5, 156.2, 158.6, 169.0, 176.0. $^{19}$F NMR (470 MHz, CDCl$_3$) δ: −64.00, Anal. Calculated (Found): C, 61.45, (61.95); H, 5.15 (5.20); O, 19.49 (17.69); F, 13.88 (14.25)%.

FIG. 1 illustrates the IR spectra of polymer films for polymer number 8 at (a) and polymer number 22 at (b). As can be seen, the spectra of these polymers which include lactide confirmed the presence of C=O at 1744 cm$^{-1}$.

Figure 2:
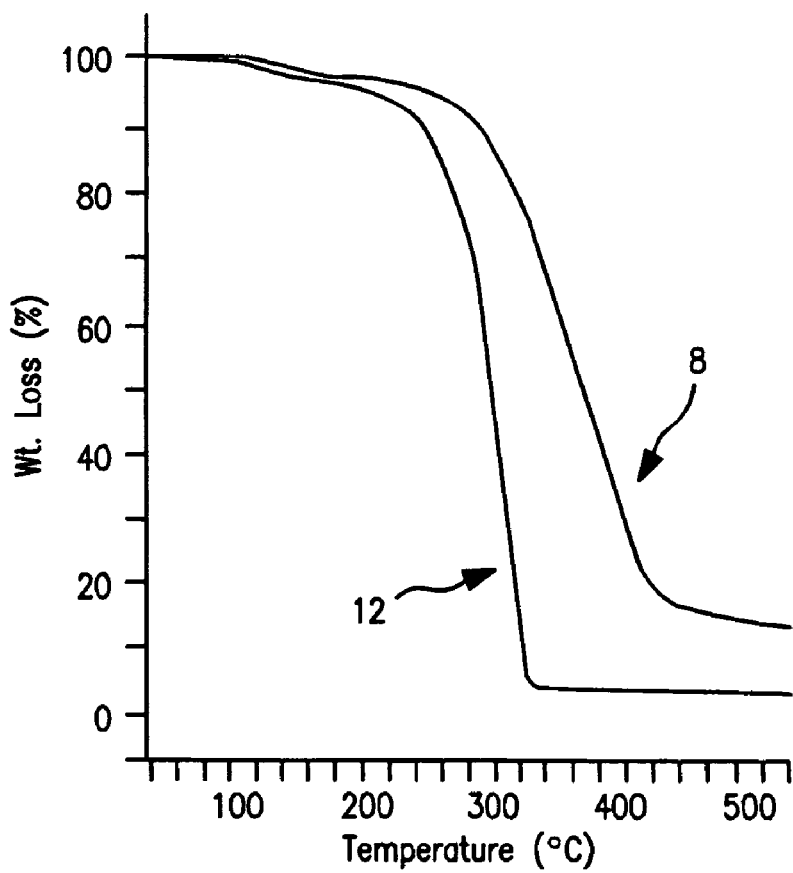
FIG. 2 illustrates thermogravimetric analysis in nitrogen for two polymer films produced according to the processes of the present invention.

The thermal stability of the copolymers was evaluated by thermogravimetric analysis (TGA) in nitrogen. FIG. 2 shows typical TGA curves for polylactide homopolymer (polymer number 12) and for the terpolymer number 8. Polylactide 12 decomposed with catastrophic weight loss above 260° C. while terpolymer 8 remained intact above 300° C. Although the molecular weight of homopolymer 12 is very low, this value compares well with the degradation of high molecular weight commercial polylactide (ca. 290° C.) under the same conditions.

EXAMPLE 2

The terpolymerization of lactide with 6F-Bis-A and DGEBA was catalyzed by 18C6/KCl. Among the number of polymerization media evaluated, it was found the utilization of Dowanol™ as the solvent at a polymerization temperature below 120° C. produced a transparent terpolymer. Other solvents used included ethyl lactate. Polymerizations conducted with higher lactide molar ratios yielded dark brown, low molecular weight mixtures. The reactions were carried out with lactide, DGEBA and 6F-Bis-A using 18C6/KCl 1 mol % in 50 wt % of solvent at 110° C. for 24 hrs. Polymers 24–32 were obtained as summarized below in Table 3. Process conditions for each polymer are also shown in the table.

TABLE 3

| Polymer Number | Lactide/ DGEBA/ 6F-Bis-A Mol ratio | Solvent | Mn | PDI |
|---|---|---|---|---|
| 24 | 1:1:1 | Dowanol | 46000 | 2.3 |
| 25 | 2:1:1 | Dowanol | 11100 | 1.5 |
| 26 | 1:2:2 | Dowanol | 22000 | 1.6 |
| 27 | 0:1:1 | Dowanol | 21000 | 1.7 |
| 28 | 1:1:0 | Dowanol | N/A$^d$ | |
| 29 | 1:0:1 | Dowanol | 1245 | 5.2 |
| 30 | 1:1:1 | Neat | 13700 | 3.5 |
| 31 | 1:1:1 | Toluene | 10400 | 2.0 |
| 32 | 1:1:1 | Diglyme | 13500 | 1.8 |

Figure 3:
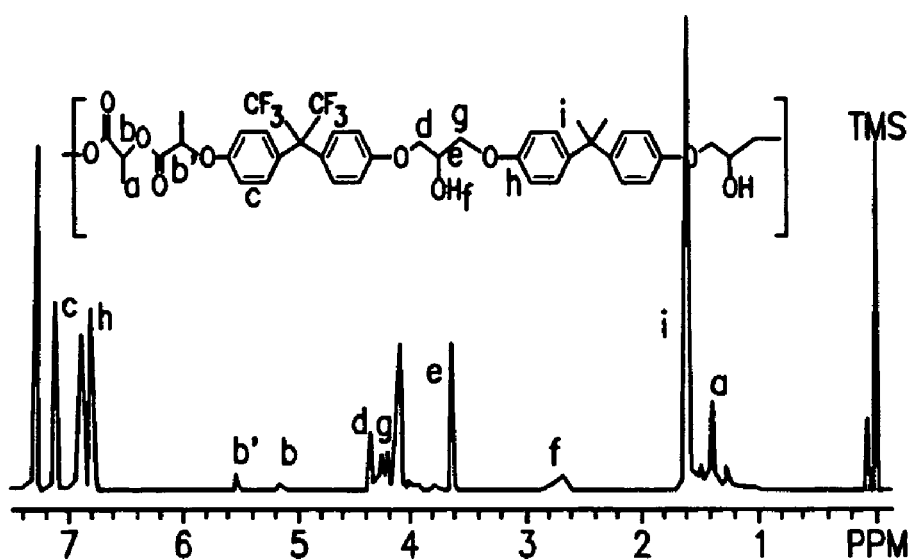
FIG. 3 illustrates HNMR spectra of a terpolymer of the present invention.

The $^1$H NMR of terpolymer number 24 shows an excellent selectivity of comonomer alternating enchainment and no lactide moiety defects were observed (FIG. 3). Polymer 4 exhibits signals of δ-proton at 5.1 and phenyl ester α-proton at 5.5 ppm (multiplet) assigned to the alpha protons in the lactide moiety. The peak area ratio of these alpha protons as well as the alpha proton ratio to normalized aromatic protons is 1.0. This suggests that one lactide is opened per phenolic and epoxy monomer. The $^{13}$C spectra of the polymer also supported the terpolymer structure. In support of this assumption, elemental analysis of the terpolymer also shows excellent agreement.

Figure 4:
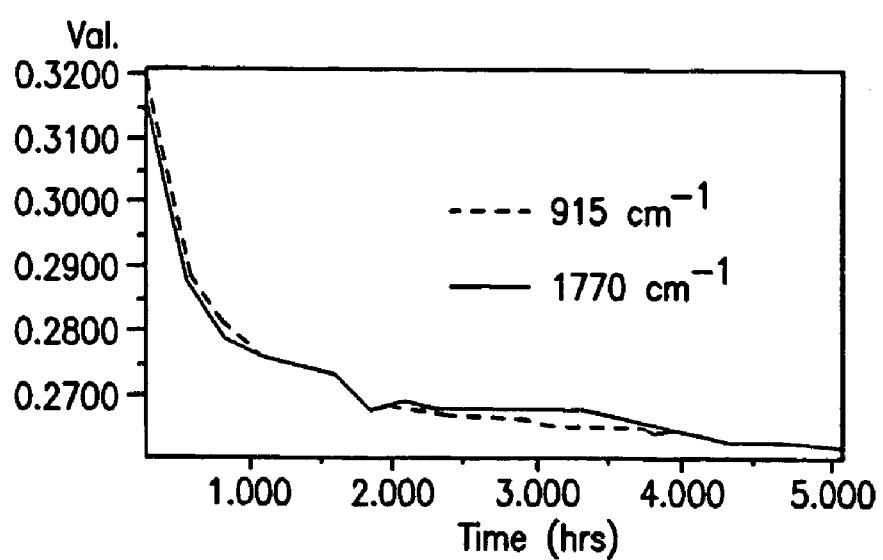
FIG. 4 illustrates the time vs. conversion relationship for lactide and epoxide monomers in the presence of 18C6/KCl catalyst.

Further, in-situ mid-infrared spectroscopy was utilized to monitor the terpolymerization. Utilizing a ReactIR 1000 (ASI Applied Systems) reaction analysis system equipped with a DiComp (diamond composite) insertion probe, solution polymerization was monitored. The strong infrared absorbance of the C=O (1770 cm$^{-1}$) of lactide moiety was shifted to 1740 cm$^{-1}$ and C—O—C absorbance (epoxy, 915 cm$^{-1}$) of DGEBA disappeared by the forming polymer. The plot of monomer conversion vs. time determined by the decrease of the carbonyl peak area at 1770 cm$^{-1}$ and epoxide peak area at 915 cm$^{-1}$ shows that the relative rates of the monomer conversion of lactide and DGEBA are the same during the terpolymerization (FIG. 4).

Figure 5:
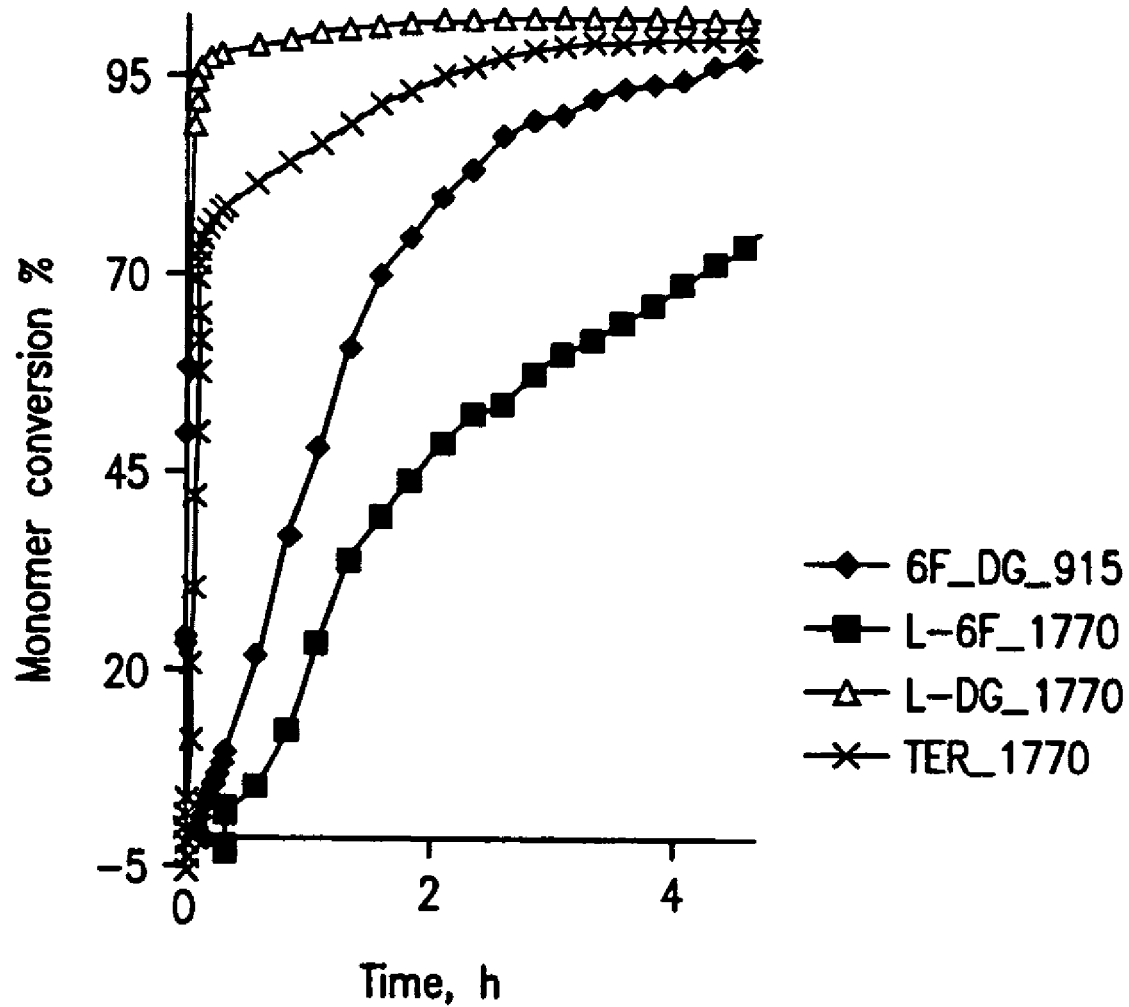
FIG. 5 illustrates the time vs. monomer conversion relationship during the reaction of different monomer combinations in the presence of 18C6/KCl catalyst.

To determine the reactivity ratio of the each monomers a series of reactions was run with the following combinations: (i) lactide and 6F-Bis-A, (ii) lactide and DGEBA, (iii) lactide, DGEBA and 6F-Bis-A, (iv) 6F-Bis-A and DGEBA under the same experimental conditions and studied by reactIR spectroscopy. Lactide and epoxide monomer conversion in each case was monitored by the decrease of either the carbonyl peak area at 1770 cm$^{-1}$ or epoxide peak area at 915 cm$^{-1}$ (FIG. 5). It is observed that the Lactide conversion at terpolymerization in the presence of DGEBA is competitive with lactide conversion in lactide-DGEBA reaction. Interestingly, the discoloration of the reaction mixture of lactide and DGEBA was not observed when the reaction was accomplished in the presence of 6F-Bis-A. On the basis of monomer conversion data, the following reaction rate order can be suggested; lactide+DGEBA>6F-Bis-A+ DGEBA>lactide+6F-Bis-A. These results confirm the possibility of obtaining a terpolymer of 1:1:1 insertion of each monomer without crosslinking. On the basis of the experimental data presented above, the reaction sequence shown previously appears justified.

The molecular weight and polydispersity indices (PDI) of the homo- and copolymers were obtained at ambient temperature on a Waters 2690 Alliance system equipped with 2410 refractive index and 996 photodiode array detectors. The terpolymerization with equal monomer ratio produced the copolymer with highest molecular weight in 1-phenoxy-2propanol (Dowanol™) at 110° C. (Table 3). Terpolymerization carried out without a catalyst at 110° C. produced a low molecular weight (Mn 1800, PDI 2.2) opaque color oligomers after 72 h. The polyaddition of 6F-Bis-A and DGEBA under the same experimental conditions produced the copolymer 27 with reasonable molecular weight.

The thermal properties of the polymers were analyzed by DSC. The amorphous terpolymer 24 shows an excellent $T_g$ (80° C.) vs. polylactide (50–60° C.). The copolymer 27 has a $T_g$ of 110° C.

For comparison, terpolymerization with Bisphenol-A in the place of 6F-Bis-A was also accomplished. As expected, the $T_g$ of the latter terpolymer was lower than the former.

EXAMPLE 3

Terpolymerization of lactide, an amino terminated poly (propyleneglycol) linking monomer (Jeffamine D400 (JD400), available from Huntsman Performance Chemicals of Houston, Tex.) and DGEBA was carried out under various conditions summarized below in Table 4 runs 4–7. The polymerization reaction can be illustrated as follows:

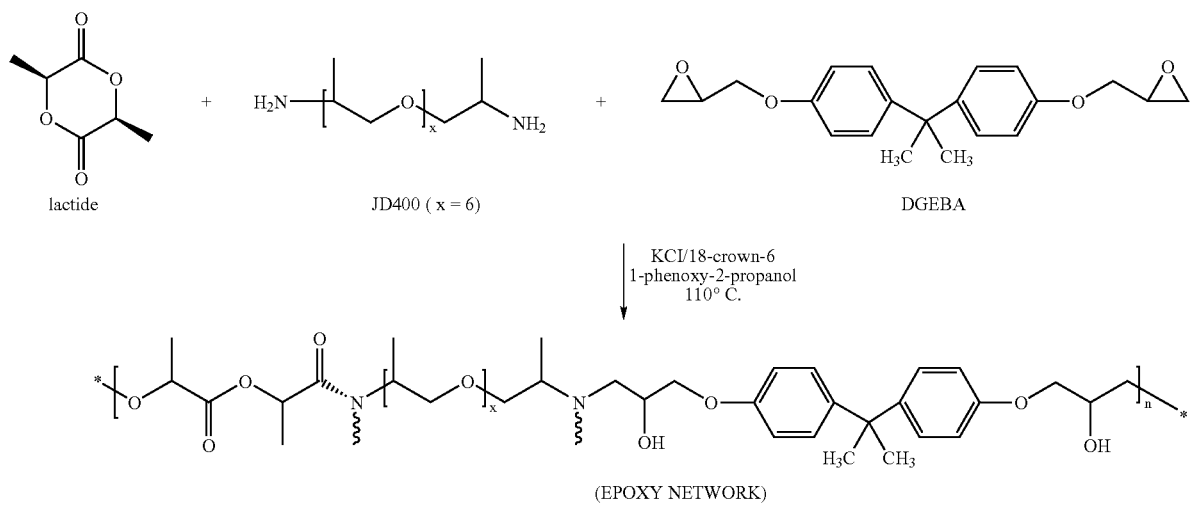

For comparison purposes, a copolymer was prepared including only the diamine and the DGEBA, the polymerization of which can be illustrated as follows:

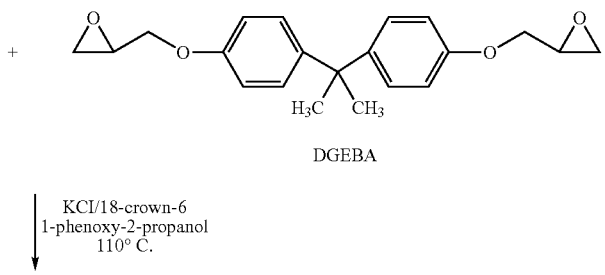

-continued

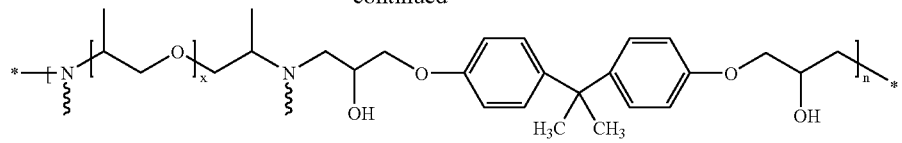

The crosslinked product terpolymer was found to have a completely different morphology than the corresponding thermoset copolymer formed without inclusion of the lactide monomer. Specifically the copolymer comprising only two monomeric components was found to be brittle, whereas the terpolymer formed including the lactide monomer was found to be an elastomeric material.

Figure 7:
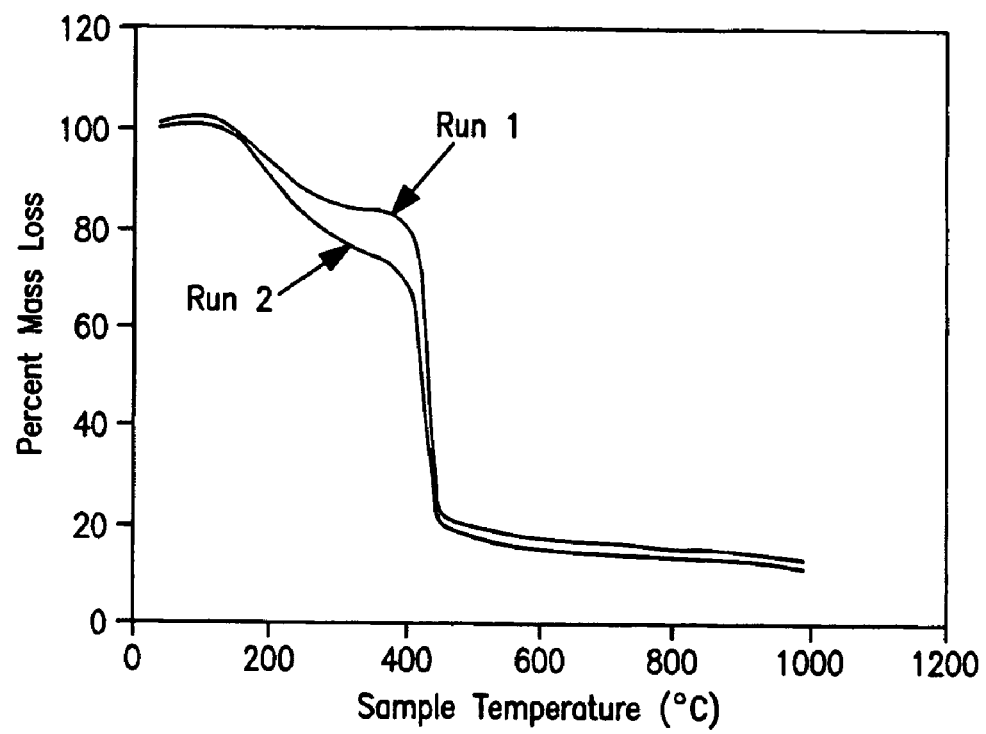
FIGS. 7 and 8 illustrate Thermal Gravimetric Analysis (TGA) data for exemplary polymeric networks of the present invention.
Figure 8:
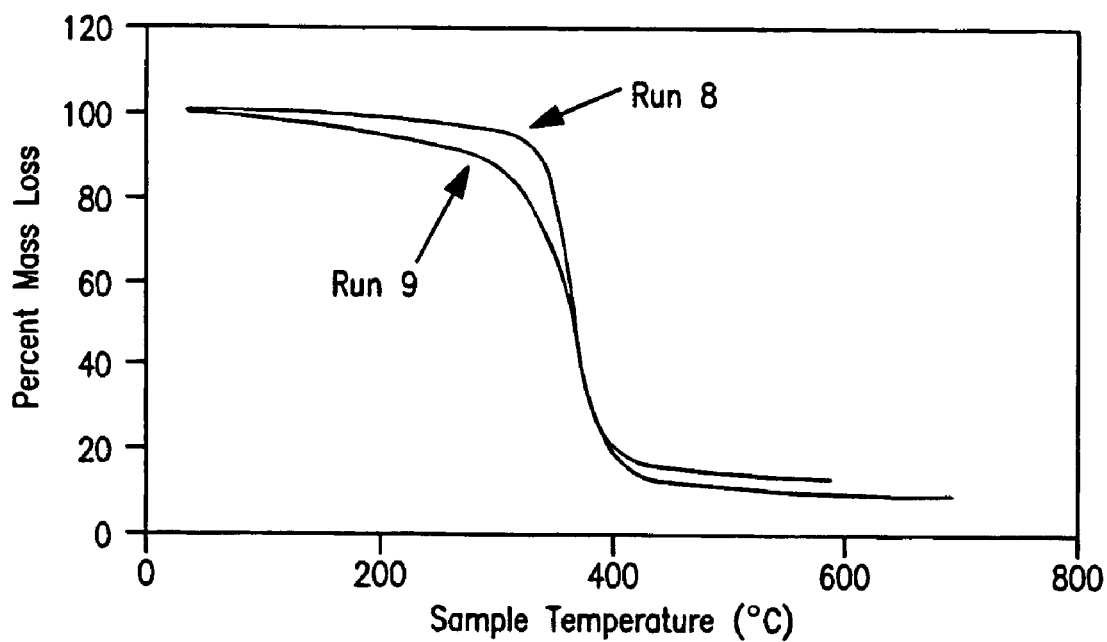
Figure 9:
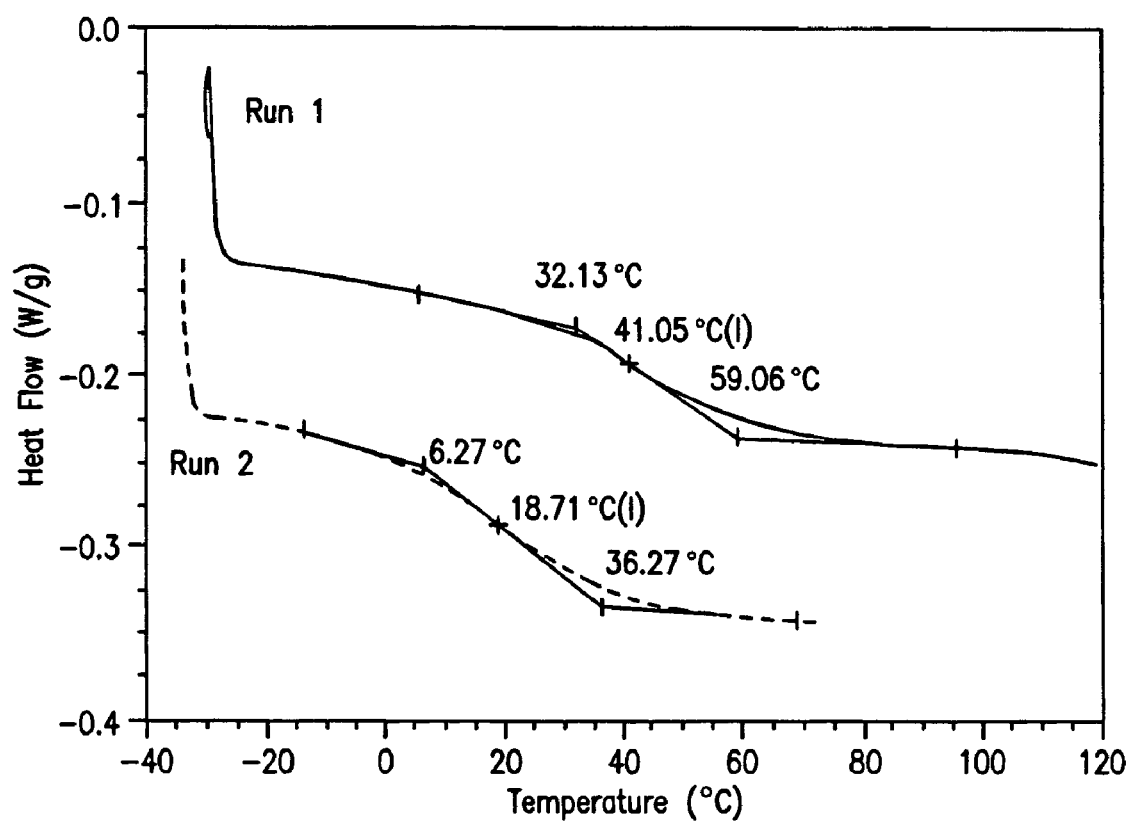
FIGS. 9 and 10 illustrate Differential Scanning Calorimetry (DSC) data for exemplary polymeric networks of the present invention.
Figure 10:
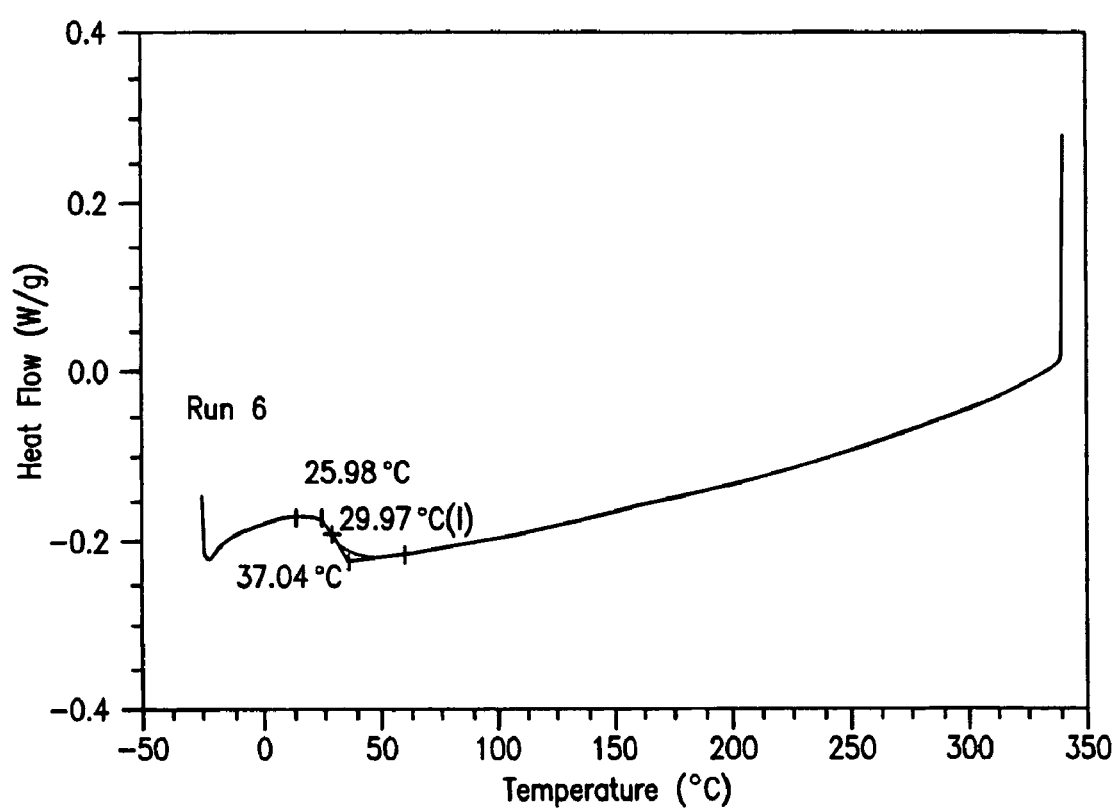

Other epoxy networks were formed from the terpolymerization of lactide with Jeffamine D400 and Bis(4-glycidyloxyphenyl)methane (B4GPM) and also from the terpolymerization of lactide with 1,1,1-Tris(4-hydroxyphenyl) ethane (THPE) and DGEBA. A summary of the reactants and conditions for polymerization is summarized in Table 4, below.

as described in Table 4. The lactic acid peak of polymers 8 and 9 can be seen marked by the arrow in the figure. FIGS. 7 and 8 illustrate TGA data for the polymeric networks of runs 1 and 2 (FIG. 7) and also of runs 8 and 9 (FIG. 8). FIGS. 9 and 10 illustrate the DSC data for exemplary polymeric networks of the present invention. Data for the polymers formed according to runs 1 and 2 described in Table 4, above, can be seen in FIG. 9, and data for the polymer of run 6 can be seen in FIG. 10.

It will be appreciated that the foregoing examples, given for purposes of illustration, are not to be construed as limiting the scope of this invention. Although only a few exemplary embodiments of this invention have been

TABLE 4

| Run # | Monomers | Molar Ratio (theoretical % LA) | Reaction Conditions | Appearance | w/w % extract. | TGA onset (° C.) |
|---|---|---|---|---|---|---|
| 1 | DGEBA:THPE:LA | 3:2:0 (0) | 130° C./4.75 h, 200° C./15.5 h | Light yellow, glassy, hard | 14 | 129 |
| 2 | DGEBA:THPE:LA | 3:2:3 (20) | 130° C./4.75 h, 200° C./15.5 h | Light yellow, glassy | 29 | 91 |
| 3 | DGEBA:THPE:LA | 3:2:6 (35) | 130° C./4.75 h, 200° C./15.5 h | Rubbery, dark brown/yellow | 23 | 111 |
| 4 | JD400:DGEBA:LA | 1:2:0 (0) | 130° C./24 h | Dark brown, good adhesive | 1 | — |
| 5 | JD400:DGEBA:LA | 1:2:2 (21) | 130° C./24 h | Rubbery, hard, clear | 7 | 300 |
| 6 | JD400:DGEBA:LA | 1:2:1 (11) | 130° C./24 h | Yellow-orange, rubbery, moldable | 2 | 343 |
| 7 | JD400:DGEBA:LA | 1:2:0.5 (6) | 130° C./24 h | Light yellow to clear, rubbery | 2 | 346 |
| 8 | JD400:B4GPM:LA | 1:2:0 (0) | 130° C./24 h | Clear, gel-like adhesive | 7 | 339 |
| 9 | JD400:B4GPM:LA | 1:2:2 (16) | 130° C./24 h | Dark orange, rubbery | 3 | 318 |
| 10 | JD400:B4GPM:LA | 1:2:1 (8) | 130° C./24 h | Dark orange, rubbery | 5 | 328 |
| 11 | JD400:B4GPM:LA | 1:2:0.5 (5) | 130° C./24 h | Yellow to clear, rubbery | 5 | 341 |

Following polymerization, the un-reacted monomers were extracted with chloroform and the crude polymers were analyzed. The terpolymers showed the presence of lactide incorporated into the crosslinked structures. The determination of the yields of the crude products confirmed this result. Thermal analysis of the materials confirmed that the incorporation of lactide into the networks lowered the glass transition temperature.

Figure 6B:
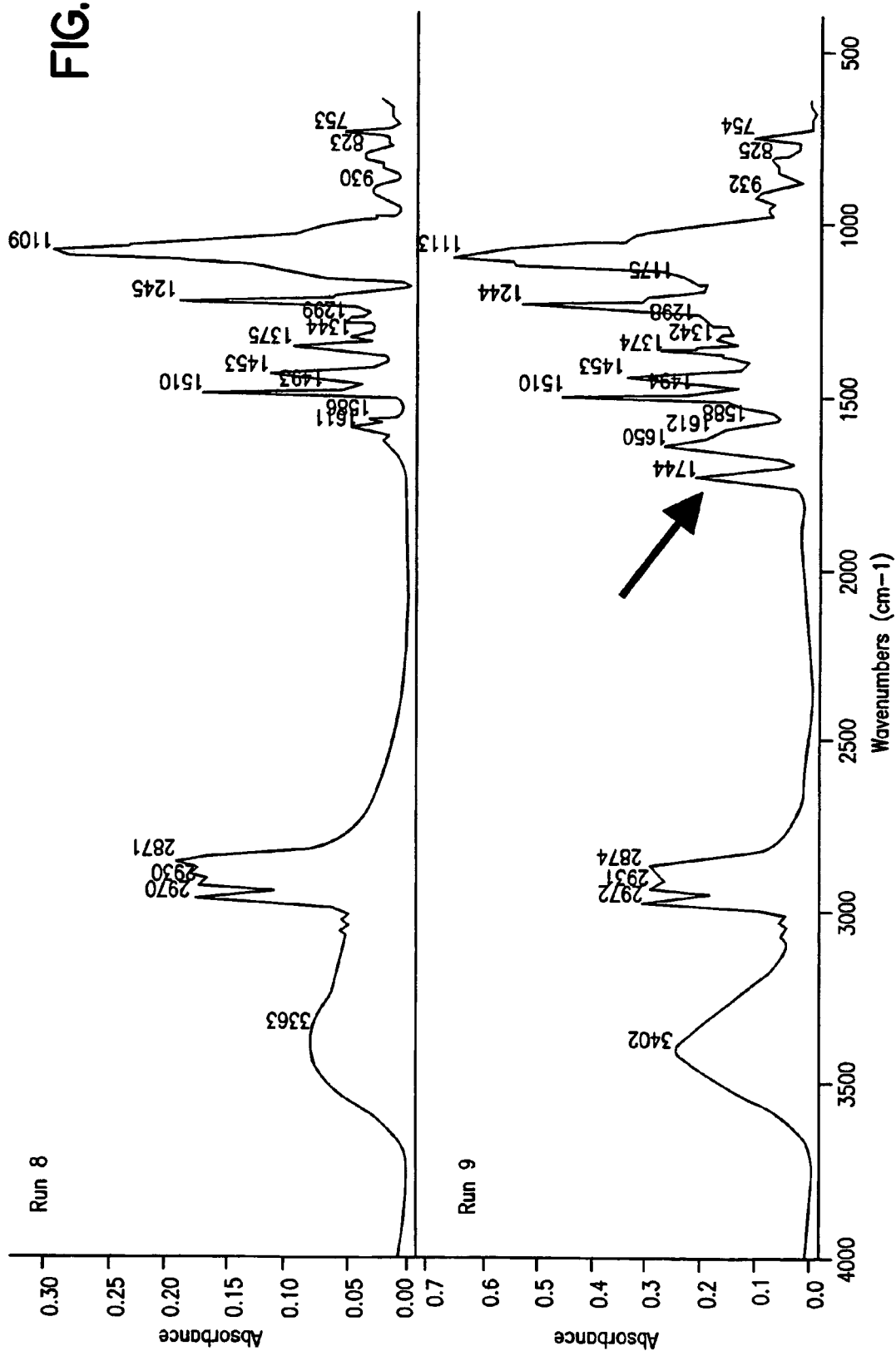

FIGS. 6A and 6B illustrates FTIR spectra of the polymeric networks obtained according to run numbers 1, 2, 8, and 9 described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be

What is claimed is:

1. A lactide-based terpolymer formed by the ring-opening polymerization of:
   a lactide monomer;
   an epoxy-terminated monomer comprising at least bi-functionality;
   a linking monomer comprising at least bi-functionality, wherein during the polymerization a first terminal functional group of the linking monomer reacts with the lactide monomer upon the ring opening of the lactide and a second terminal functional group of the linking monomer reacts with the epoxy-terminated monomer upon ring opening of the terminal epoxy group; and
   wherein at least one of the epoxy-terminated monomer or the linking monomer comprises tri- or higher functionality and the lactide-based terpolymer possesses at least tri-functionality.

2. The polymer of claim 1, wherein both the epoxy-terminated monomer and the linking monomer are at least tri-functional.

3. The polymer of claim 1, wherein the polymer has a glass transition temperature of greater than about 100° C.

4. The polymer of claim 1, wherein the polymer has a glass transition temperature of between about 190° C. and about 210°C.

5. The polymer of claim 1, wherein the terminal functional groups of the linking monomer are selected from the group consisting of hydroxyl groups and esters thereof, carboxylic acid groups, thiocarboxylic acid groups, thiocarboxylic esters, carboxylic esters, alkyl esters of from one to about 12 carbon atoms, acyl halides, isocyanates, acyl azides, acetyl groups, trihaloacetyl groups, primary and secondary amines, sulfide groups, sulfonic acid groups, sulfonamide groups, ketones, aldehydes, primary and secondary amides, nitro groups, cyano groups, anhydrides, imides, cyanate groups, vinyl, allyl, acetylene groups, alkyl silanes, siloxanes, chlorosilanes, phosphines, phosphate, phosphonate, trihalomethyl groups, alkoxy groups, and combinations thereof.

6. The polymer of claim 1, wherein the terminal functional groups of the linking monomer are selected from the group consisting of hydroxyl groups and esters thereof, carboxylic acid ester groups, thiocarboxylic acid ester groups, carboxylic acid groups, acyl chlorides, isocyanates, acetylenic groups, alkoxy groups, primary amines, secondary amines, and combinations thereof.

7. The polymer of claim 1, wherein the terminal functional groups of the linking monomer are selected from the group consisting of hydroxyl groups and esters thereof, carboxylic acid ester groups, carboxylic acid groups, acyl chlorides, isocyanates, acetylenic groups, primary amines, secondary amines, and combinations thereof.

8. The polymer of claim 1, wherein the linking monomer comprises one or more aromatic groups.

9. The polymer of claim 1, wherein the linking monomer is a bisphenol-A derivative.

10. The polymer of claim 9, wherein the linking monomer is 4,4'-hexafluoroisopropylidenediphenol.

11. The polymer of claim 1, wherein at least one of the linking monomer or the epoxy-terminated monomer comprise fluorine.

12. The polymer of claim 1, wherein the epoxy-terminated monomer comprises one or more aromatic groups.

13. The polymer of claim 12, wherein the epoxy-terminated monomer is a bisphenol-A derivative.

14. The polymer of claim 1, wherein the epoxy-terminated monomer is a glycidyl ether.

15. The polymer of claim 1, wherein the polymer has a polydispersity of between about 1.5 and about 3.5.

16. A polymeric material comprising a lactide-based terpolymer formed by the ring-opening polymerization of:
   a lactide monomer;
   an epoxy-terminated monomer comprising at least bi-functionality; and
   a linking monomer comprising at least bi-functionality, wherein during the polymerization a first terminal functional group of the linking monomer reacts with the lactide monomer upon the ring opening of the lactide and a second terminal functional group of the linking monomer reacts with the epoxy-terminated monomer upon ring opening of the terminal epoxy group,
   wherein at least one of the epoxy-terminated monomer and the linking monomer comprise at least tri-functionality and the polymeric material is a thermoset polymeric film, a thermoset polymeric coating, a thermoset polymeric fiber, or a thermoset polymeric monofilament.

17. The polymeric material of claim 16, wherein the polymeric material is a solution cast polymeric film.

18. The polymeric material of claim 17, wherein the polymeric film has a thickness of between about 2 μm and about 200 μm.

19. The polymeric material of claim 16, wherein the polymeric material is a polymeric coating of a thickness greater than about 200 μm.

20. The polymeric material of claim 16, wherein the polymeric material is a polymeric fiber or monofilament having a diameter of greater than about 2 μm.

21. A method of forming a polymer comprising:
   combining a catalyst with a solution comprising a solvent, a lactide monomer, an epoxy-terminated monomer, and a linking monomer, wherein at least one of the epoxy-terminated monomer and the linking monomer comprise tri- or higher functionality and wherein the linking monomer comprises a first terminal functional group capable of forming a bond with the lactide monomer upon the ring-opening of the lactide. and a second terminal functional group capable of forming a bond with the epoxy-terminated monomer upon ring opening of the terminal epoxy group; and
   polymerizing the lactide monomer, the epoxy-terminated monomer, and the linking monomer to form a tri- or higher-functional lactide-based terpolymer.

22. The method of claim 21, wherein the lactide monomer, the epoxy-terminated monomer, and the linking monomer are in the solution ma 1:1:1 molar ratio.

23. The method of claim 21, wherein the epoxy-terminated monomer is a phenolic derivative having at least two phenolic hydroxyl groups.

24. The method of claim 21, wherein the linking monomer is a bisphenol-A derivative.

25. The method of claim 21, wherein the terminal functional groups of the linking monomer are selected from the group consisting of hydroxyl groups and esters thereof, carboxylic acid groups, thiocarboxylic acid groups, thiocarboxylic esters, carboxylic esters, alkyl esters of from one to about 12 carbon atoms, acyl halides, isocyanates, acyl azides, acetyl groups, trihaloacetyl groups, primary and secondary amines, sulfide groups, sulfonic acid groups, sulfonamide groups, ketones, aldehydes, primary and secondary amides, nitro groups, cyano groups, anhydrides, imides, cyanate groups, vinyl, allyl, acetylene groups, alkyl silanes, siloxanes, chlorosilanes, phosphines, phosphate, phosphonate, trihalomethyl groups, alkoxy groups, and combinations thereof.

26. The method of claim 21, further comprising heating the solution to a temperature of between about 100° C. and about 200° C. prior to combining the solution with the catalyst.

27. The method of claim 21, wherein the catalyst is selected from the group consisting of phosphonium-based catalysts, quaternary ammonium salts, and crown ether complexes.

28. The method of claim 21, wherein the catalyst is selected from the group consisting of ethyltriphenylphosphonium acid acetate, ethyltriphenlphosphonium iodide, benzyltriphenylphosphonium chloride, 18-Crown-6, tetrabutylammonium chloride, tetrabutylammonium bromide, potassium chloride, potassium bromide, and mixtures thereof.

29. The method of claim 21, wherein the solvent has a boiling temperature at atmospheric pressure of less than about 200° C.

30. The method of claim 21, wherein the solvent is selected from the group consisting of anhydrous toluene, 2-methoxyethyl ether, 1-phenoxy-2-propanol, ethyl lactate, and N,N'-dimethylacetamide.

31. The method of claim 21, wherein the solvent is an ecologically compatible solvent.

32. A lactide-based terpolymer formed by the ring-opening polymerization of:
a lactide monomer;
an epoxy-terminated monomer comprising at least bi-functionality; and
a linking monomer comprising at least bi-functionality, wherein the terminal functional groups of the linking monomer are selected from the group consisting of carboxylic acid groups, thiocarboxylic acid groups, thiocarboxylic esters, carboxylic esters, alkyl esters of from one to about 12 carbon atoms, acyl halides, isocyanates, acyl azides, acetyl groups, trihaloacetyl groups, primary and secondary amines, sulfide groups, sulfonic acid groups, sulfonamide groups, ketones, aldehydes, primary and secondary amides, nitro groups, cyano groups, anhydrides, imides, cyanate groups, vinyl, allyl, acetylene groups, alkyl silanes, siloxanes, chlorosilanes, phosphines, phosphate, phosphonate, trihalomethyl groups, alkoxy groups, and combinations thereof; and
wherein the polymer is a block terpolymer, the terpolymer block comprising the residue of the linking monomer between the residue of the lactide monomer and the residue of the epoxy-terminated monomer.

33. The polymer of claim 32, wherein both the epoxy-terminated monomer and the linking monomer are bi-functional.

34. The polymer of claim 33, wherein the lactide-based terpolymer has a glass transition temperature of greater than about 60° C.

35. The polymer of claim 33, wherein the lactide-based terpolymer has a glass transition temperature of between about 75° C. and about 85° C.

36. The polymer of claim 32, wherein at least one of the epoxy-terminated monomer and the linking monomer is at least tri-functional.

37. The polymer of claim 36, wherein the polymer has a glass transition temperature of greater than about 100° C.

38. The polymer of claim 36, wherein the polymer has a glass transition temperature of between about 190° C. and about 210° C.

39. The polymer of claim 32, wherein the terminal functional groups of the linking monomer are selected from the group consisting of carboxylic acid ester groups, thiocarboxylic acid ester groups, carboxylic acid groups, acyl chlorides, isocyanates, acetylenic groups, alkoxy groups, primary amines, secondary amines, and combinations thereof.

40. The polymer of claim 32, wherein the terminal functional groups of the linking monomer are selected from the group consisting of primary amines, secondary amines, and combinations thereof.

41. The polymer of claim 32, wherein at least one of the linking monomer and the epoxy-terminated monomer comprises fluorine.

42. The polymer of claim 32, wherein the epoxy-terminated monomer comprises one or more aromatic groups.

43. The polymer of claim 32, wherein the epoxy-terminated monomer is a glycidyl ether.

* * * * *

UNITED STATES PATENT AND TRADEMARK OFFICE
CERTIFICATE OF CORRECTION

PATENT NO. : 7,071,288 B2
APPLICATION NO. : 10/819900
DATED : July 4, 2006
INVENTOR(S) : Dennis W. Smith and Nilmini Abayasinghe It is certified that error appears in the above-identified patent and that said Letters Patent is hereby corrected as shown below:

Column 20, Line 54: "mer are in the solution ma 1:1:1 molar ratio." should be --mer are in the solution in a 1:1:1 molar ratio.--

Signed and Sealed this

Twenty-first Day of November, 2006

JON W. DUDAS
*Director of the United States Patent and Trademark Office*